(12) United States Patent
Arao et al.

(10) Patent No.: US 8,644,483 B2
(45) Date of Patent: *Feb. 4, 2014

(54) TELEPHONE RELAY APPARATUS, TELEPHONE RELAY SYSTEM, RECORDING MEDIUM AND DATA PROCESSING METHOD

(75) Inventors: Shinya Arao, Tokyo (JP); Teruharu Serada, Tokyo (JP); Hirokazu Yamada, Tokyo (JP); Noriaki Hayase, Tokyo (JP); Takayuki Omino, Tokyo (JP); Yasuaki Tsunemi, Tokyo (JP); Kenichi Kamiya, Tokyo (JP); Michio Nishioka, Tokyo (JP)

(73) Assignee: NEC Corporation, Tokyo (JP)

( * ) Notice: Subject to any disclaimer, the term of this patent is extended or adjusted under 35 U.S.C. 154(b) by 854 days.

This patent is subject to a terminal disclaimer.

(21) Appl. No.: 12/496,082

(22) Filed: Jul. 1, 2009

(65) Prior Publication Data

US 2010/0002862 A1    Jan. 7, 2010

(30) Foreign Application Priority Data

Jul. 2, 2008    (JP) .................................. 2008-173532

(51) Int. Cl.
*H04M 3/42* (2006.01)

(52) U.S. Cl.
USPC .................................. 379/211.01; 379/211.02

(58) Field of Classification Search
USPC .......................... 379/211.03, 211.02, 211.01
See application file for complete search history.

(56) References Cited

U.S. PATENT DOCUMENTS

| | | | |
|---|---|---|---|
| 6,101,396 A | 8/2000 | Chavez | |
| 6,804,343 B2 * | 10/2004 | Hafez | 379/211.01 |
| 7,194,080 B2 * | 3/2007 | Worsham et al. | 379/211.03 |
| 2002/0146103 A1 * | 10/2002 | Holt et al. | 379/211.02 |
| 2005/0008137 A1 | 1/2005 | Naito | |

FOREIGN PATENT DOCUMENTS

| | | |
|---|---|---|
| EP | 1450547 A1 | 8/2004 |
| JP | 1992246957 A | 9/1992 |
| JP | 1997224089 A | 8/1997 |
| JP | 2004172656 A | 6/2004 |
| JP | 2004172769 A | 6/2004 |
| JP | 2004343492 A | 12/2004 |
| JP | 2007174205 A | 7/2007 |

OTHER PUBLICATIONS

Japanese Office Action for JP2008-173532 issued Apr. 24, 2012.
Extended European Search Report for EP09164300.7 dated Dec. 7, 2012.
European Search Report for EP09164300.7 dated Jan. 9, 2013.

* cited by examiner

*Primary Examiner* — Duc Nguyen
*Assistant Examiner* — Sonia Gay

(57) ABSTRACT

A telephone relay apparatus stores peripheral telephone numbers of a plurality of peripheral telephone terminals scheduled to be located at the periphery of each specific terminal user. When a line connecting request from an outgoing telephone terminal of an arbitrary telephone outgoing user to a specific telephone terminal is received, connection of a telephone call execution line from the outgoing telephone terminal to the specific telephone terminal is tried. Therefore, when the connection is connected, a telephone call between the telephone outgoing user and the specific terminal user can be immediately made. However, when the telephone call execution line to the specific telephone terminal is not connected, the peripheral telephone terminal is selected in a transfer trying order, and connection of the telephone call execution line is tried with the peripheral telephone numbers in the transfer trying order.

10 Claims, 8 Drawing Sheets

TELEPHONE RELAY APPARATUS, TELEPHONE RELAY SYSTEM, RECORDING MEDIUM AND DATA PROCESSING METHOD

This application is based on Japanese patent application No. 2008-173532, the content of which is incorporated hereinto by reference.

BACKGROUND

1. Technical Field

The present invention relates to a telephone relay apparatus which connects a communication line to a specific telephone terminal of a specific terminal user in response to a line connecting request from an outgoing telephone terminal of an arbitrary telephone outgoing user, a telephone relay system having the telephone relay apparatus, a recording medium and a data processing method for the telephone relay apparatus.

2. Related Art

At present, in a large company or the like, a specific terminal user such as an employee is lent an in-office specific telephone terminal which forms a part of a telephone relay system. In the telephone relay system, for example, a line connecting request from an outgoing telephone terminal of an outside telephone outgoing user is received by an in-office telephone relay apparatus and relayed to the specific telephone terminal of the specific terminal user.

In order to improve the convenience of the above telephone relay, a telephone relay system which always detects a position of an employee in an office with an ID card and connects a line connecting request from an outgoing telephone terminal to a fixed telephone terminal at the position detected with the ID card is also proposed (for example, see Japanese Patent Application Laid-open (JP-A) No. 04-246957).

A telephone relay system which receives a line connecting request from an outgoing telephone terminal, selects a specific internal fixed telephone in the office with an outgoing telephone number of the outgoing telephone terminal, and connects the line connecting request to the internal fixed telephone is proposed (for example, see JP-A No. 09-224089).

However, the above telephone relay system cannot cope with the case in which a line connecting request from the outgoing telephone terminal is not connected to the specific telephone terminal of the specific terminal user. In order to cope with this situation, an answer phone service or a telephone forwarding service is used at present.

However, in the answer phone service, an emergency line connecting request cannot be connected to a specific terminal user. Also in the telephone forwarding service, since a line connecting request is transferred to only one specific telephone terminal, when the telephone terminal is not located at the periphery of the specific terminal user, an emergency line connecting request cannot be connected to the specific terminal user.

SUMMARY

The present invention has been made in consideration of the above problem and provides a telephone relay apparatus which can exclude a situation in which an emergency line connecting request from the outgoing telephone terminal is not connected to a specific terminal user as much as possible, an telephone relay system having the telephone relay apparatus, a recording medium and a data processing method for the telephone relay apparatus.

In one embodiment, there is provided a telephone relay apparatus including: a specific storing unit which stores a specific telephone number serving as a telephone number of at least one specific telephone terminal used by a specific terminal user; a peripheral storing unit which stores peripheral telephone numbers serving as telephone numbers of a plurality of peripheral telephone terminals scheduled to be located at the periphery of each specific terminal user; a request receiving unit which receives a line connecting request from an outgoing telephone terminal of an arbitrary telephone outgoing user to a specific telephone terminal; a specific connecting unit which tries connection of a telephone call execution line from the outgoing telephone terminal to the specific telephone terminal by the specific telephone number in response to the received line connecting request; a peripheral selecting unit which selects at least one peripheral telephone terminal according to a predetermined transfer trying order when the telephone call execution line to the specific telephone terminal is not connected; and a telephone call forward unit which tries connection of the telephone call execution line from the outgoing telephone terminal to the selected peripheral telephone terminal with the peripheral telephone numbers.

In another embodiment, there is provided a recording medium which records a computer program for a telephone relay apparatus, said computer program causes said telephone relay apparatus to execute: a specific storing process which stores a specific telephone number serving as a telephone number of at least one specific telephone terminal used by a specific terminal user; a peripheral storing process which stores peripheral telephone numbers serving as telephone numbers of a plurality of peripheral telephone terminals scheduled to be located at the periphery of each specific terminal user; a request receiving process which receives a line connecting request from an outgoing telephone terminal of an arbitrary telephone outgoing user to a specific telephone terminal; a specific connecting process which tries connection of a telephone call execution line from the outgoing telephone terminal to the specific telephone terminal by the specific telephone number in response to the received line connecting request; a peripheral selecting process which selects at least one peripheral telephone terminal according to a predetermined transfer trying order when the telephone call execution line to the specific telephone terminal is not connected; and a telephone call transfer process which tries connection of the telephone call execution line from the outgoing telephone terminal to the selected peripheral telephone terminal with the peripheral telephone numbers.

In still another embodiment, there is provided a data processing method for a telephone relay apparatus including: a specific storing operation which stores a specific telephone number serving as a telephone number of at least one specific telephone terminal used by a specific terminal user; a peripheral storing operation which stores peripheral telephone numbers serving as telephone numbers of a plurality of peripheral telephone terminals scheduled to be located at the periphery of each specific terminal user; a request receiving operation which receives a line connecting request from an outgoing telephone terminal of an arbitrary telephone outgoing user to a specific telephone terminal; a specific connecting operation which tries connection of a telephone call execution line from the outgoing telephone terminal to the specific telephone terminal by the specific telephone number in response to the received line connecting request; a peripheral selecting operation which selects at least one peripheral telephone terminal according to a predetermined transfer trying order when the telephone call execution line to the specific telephone terminal is not connected; and a telephone call transfer operation which tries connection of the telephone call execution line from the outgoing telephone terminal to the selected peripheral telephone terminal with the peripheral telephone numbers.

Various constituent elements of the present invention may be formed to realize the functions of the constituent elements. For example, the constituent elements may be realized as dedicated hardware which achieves a predetermined function, a telephone relay apparatus to which a computer program gives a specific function, a predetermined function realized by the telephone relay apparatus with a computer program, and an arbitrary combination thereof.

Various constituent elements of the present invention need not be independently arranged. A plurality of constituent elements may be formed as one member, one constituent element may be formed by a plurality of members, a certain constituent element may be a part of another constituent element, or a part of a certain constituent element and a part of another constituent element may overlap.

In the data processing method according to the present invention, a plurality of operations are sequentially described. However, the order of description does not limit an order of executing the plurality of operations. For this reason, when the data processing method according to the present invention is performed, the order of the plurality of operations may be changed within a scope without any trouble in the contents.

Furthermore, in the data processing method according to the present invention, a plurality of operations need not be always executed at different timings, respectively. For this reason, when another operation may occur during execution of a certain operation, or all or some of execution timings of the certain operation may overlap execution timings of the another execution timing.

The telephone relay apparatus and the data processing apparatus according to the present invention can be executed as hardware structured by general-purpose devices such as a CPU (Central Processing Unit), a ROM (Read Only Memory), a RAM (Random Access Memory), an I/F (Interface) unit and the like to read a computer program to make it possible to execute a corresponding processing operation, a dedicated logic circuit structured to execute a predetermined processing operation, and a combination thereof, or the like.

In the telephone relay apparatus according to the present invention, a specific telephone number of at least one specific telephone terminal used by a specific terminal user is stored by the specific storing unit, and peripheral telephone numbers of a plurality of peripheral telephone terminals scheduled to be located at the periphery of each specific terminal user are stored by the peripheral storing unit. In this state, when a line connecting request from an outgoing telephone terminal of an arbitrary telephone outgoing user to a specific telephone terminal is received by the request receiving unit, connection to a telephone call execution line from the outgoing telephone terminal to the specific telephone terminal by the specific telephone number in response to the received line connecting request is tried by the specific connecting unit. At this time, when the telephone call execution request is connected, a telephone call between the telephone outgoing user and the specific terminal user may be immediately performed with the outgoing telephone terminal and the specific telephone terminal. However, when the telephone call execution line to the specific telephone terminal is not connected, at least one peripheral telephone terminal is selected by the peripheral selecting unit according to a predetermined transfer trying order. Connection of the telephone call execution line from the outgoing telephone terminal to the selected peripheral telephone terminal are tried by the telephone call forward unit with the peripheral telephone numbers. For this reason, the outgoing telephone terminal which is not connected to the specific telephone terminal is connected to the peripheral telephone terminal, so that the probability of executing a telephone call between the telephone outgoing user and the specific terminal user with the peripheral telephone terminal and the outgoing telephone terminal may be increased.

BRIEF DESCRIPTION OF THE DRAWINGS

The above and other objects, advantages and features of the present invention will be more apparent from the following description of the certain preferred embodiments taken in conjunction with the accompanying drawings, in which.

DETAILED DESCRIPTION

Figure 1:
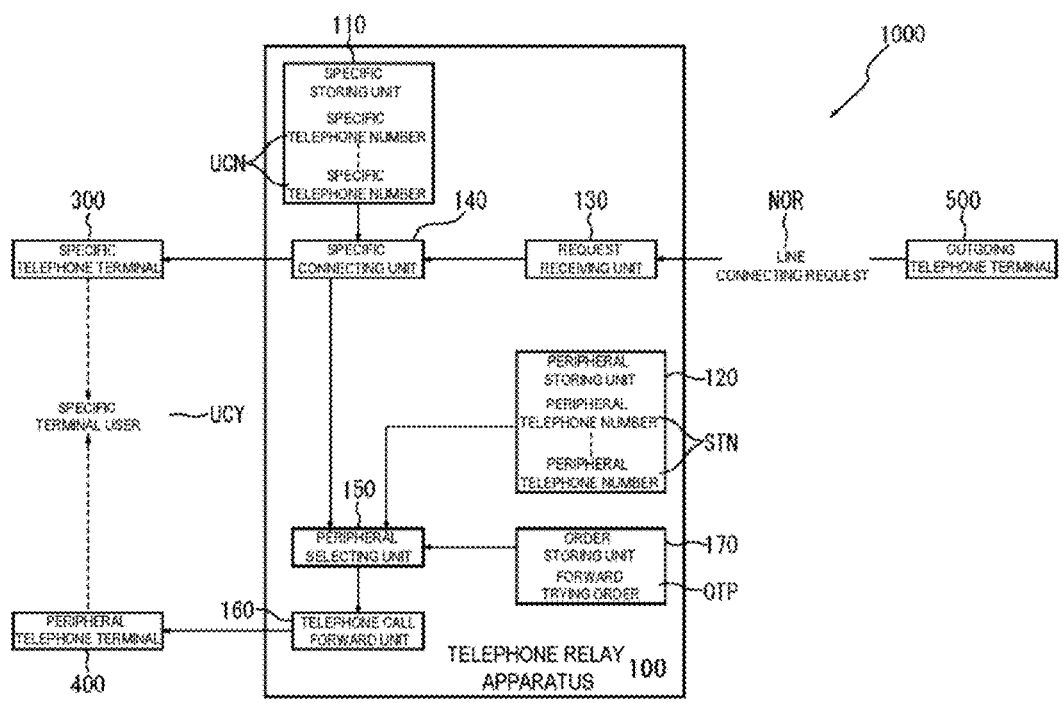
FIG. 1 is a schematic block diagram showing a logic structure of a telephone relay system according to an embodiment of the present invention.
Figure 2:
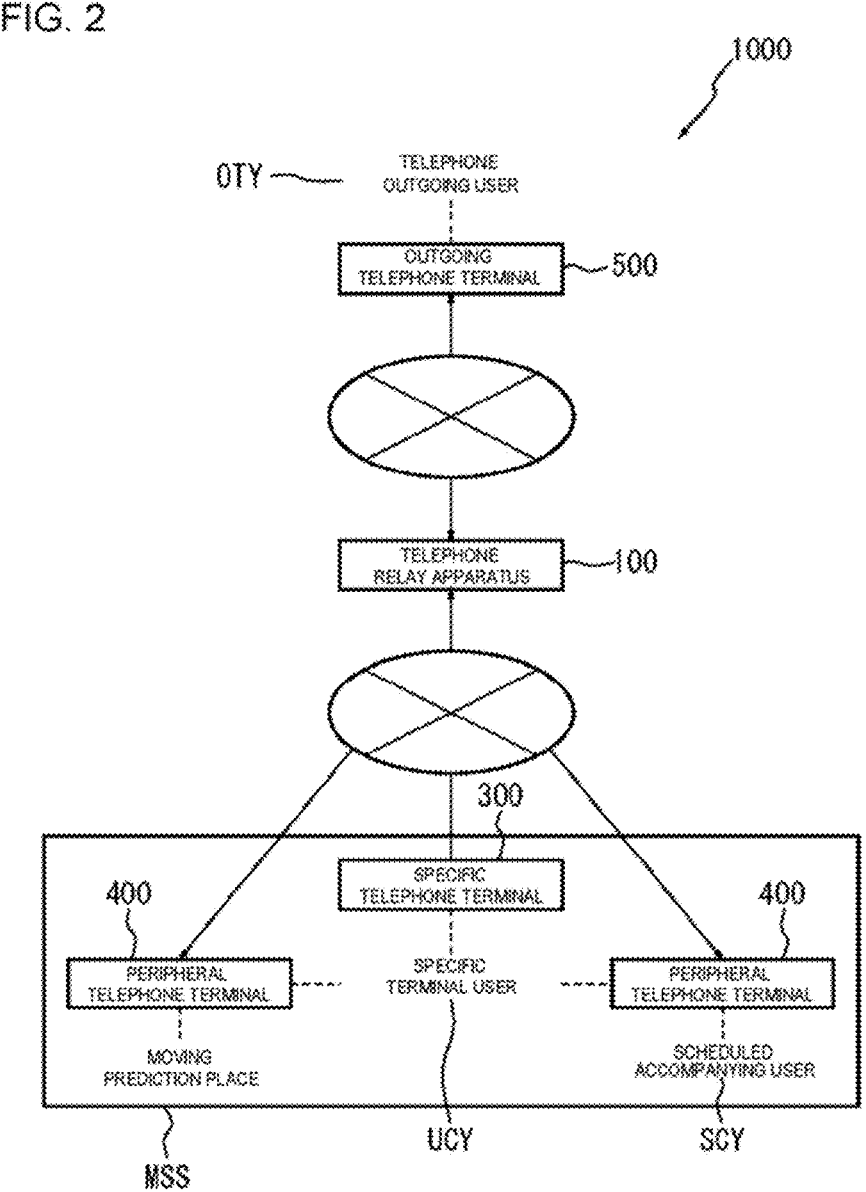
FIG. 2 is a block diagram showing a physical structure of the telephone relay system.
Figure 3:
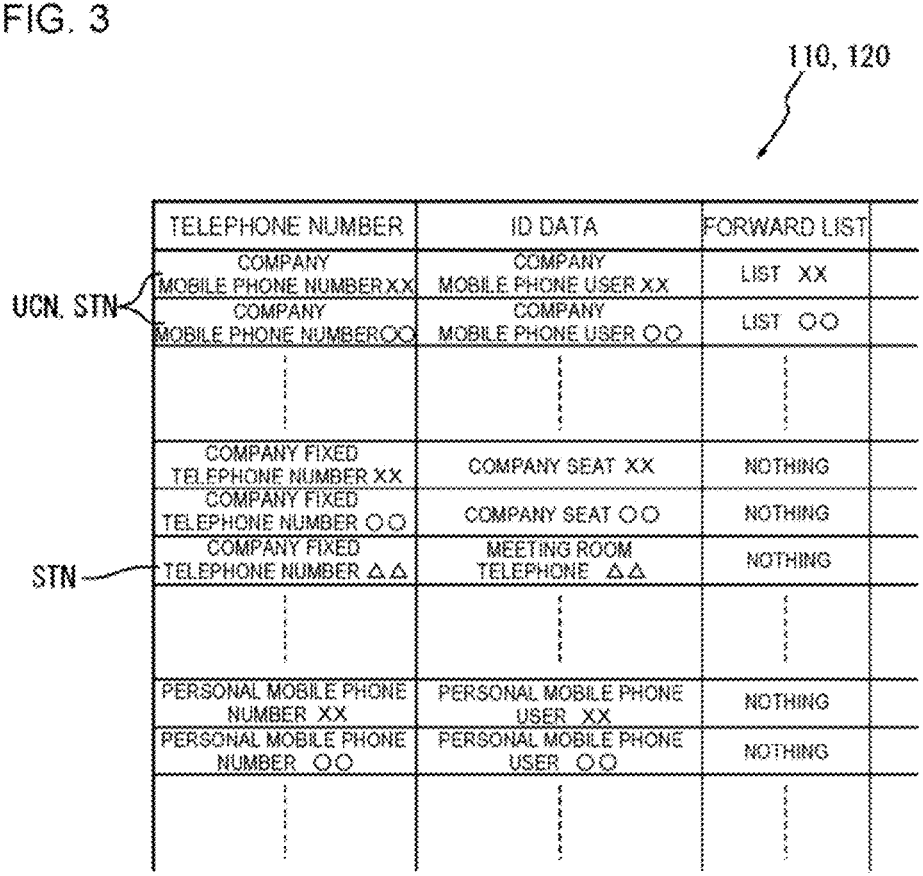
FIG. 3 is a schematic view showing a storage structure of a telephone number list serving as a specific storing unit and a peripheral storing unit.

The invention will be now described herein with reference to illustrative embodiments. Those skilled in the art will recognize that many alternative embodiments can be accomplished using the teachings of the present invention and that the invention is not limited to the embodiments illustrated for explanatory purposed.

An embodiment of the present invention will be described below. A telephone relay apparatus 100 according to the embodiment includes: a specific storing unit 110 which stores a specific telephone number UCN of at least one specific telephone terminal 300 ordinarily used by a specific terminal user UCY; a peripheral storing unit 120 which stores peripheral telephone numbers STN of a plurality of peripheral telephone terminals 400 scheduled to be located at the periphery of each specific terminal user UCY; a request receiving unit 130 which receives a line connecting request NOR from an outgoing telephone terminal 500 of an arbitrary telephone outgoing user OTY to the specific telephone terminal 300; a specific connecting unit 140 which tries connection of a telephone call execution line from the outgoing telephone terminal 500 to the specific telephone terminal 300 by the specific telephone number UCN in response to the received line connecting request NOR; a peripheral selecting unit 150 which selects at least one of the peripheral telephone terminals 400 according to a predetermined transfer trying order OTP when the telephone call execution line to the specific telephone terminal 300 is not connected; and telephone call forward unit 160 which tries connection of the telephone call execution line from the outgoing telephone terminal 500 to the selected peripheral telephone terminals 400 with each of the peripheral telephone numbers STN.

More specifically, the telephone relay apparatus 100 is configured by, for example, a digital PBX (Private Branch exchange) server and installed in a predetermined company. At least some of employees of the company are composed of specific terminal users UCY.

Furthermore, a scheduled accompanying user SCY which is scheduled to be located at the periphery of the specific terminal user UCY is also composed of, for example, an employee or the like of the company. For example, the specific terminal user UCY may be composed of a division head, a section head, or the like of the company, and the scheduled accompanying user SCY is composed of a secretary or a subordinate of the specific terminal user UCY.

The specific terminal user UCY or the scheduled accompanying user SCY need not be fixedly set. Therefore, an employee or the like who is the specific terminal user UCY with respect to a certain scheduled accompanying user SCY and also the scheduled accompanying user SCY with respect to a certain specific terminal user UCY may be present.

The specific terminal user UCY always carries a so-called mobile phone terminal as the specific telephone terminal 300. The scheduled accompanying user SCY also always carries a so-called mobile phone terminal as the peripheral telephone terminal 400.

The specific telephone terminal 300 and the peripheral telephone terminal 400 may be personally owned or lent by a company. However, the specific telephone number UCN and the peripheral telephone number STN are registered in the telephone relay apparatus 100.

The above company has moving prediction places MSS such as a plurality of meeting rooms. A fixed telephone or an IP (Internet Protocol) telephone is installed in each of the moving prediction places MSS as the peripheral telephone terminal 400. Furthermore, factory equipment of the company, a meeting room of an associated company, or the like may be set as the moving prediction place MSS, and the peripheral telephone terminals 400 may be installed in the factory equipment, the meeting room, or the like.

The telephone relay apparatus 100 is formed by hardware such as a CPU, an HDD (Hard Disc Drive), and an I/F unit. A specific computer program is installed in the telephone relay apparatus 100 as software. Various pieces of hardware execute various processing operations in response to the computer program, so that the units 110 to 160 are logically realized.

For example, as will be described below in detail, the specific storing unit 110, the peripheral storing unit 120, and the like correspond to storage areas constructed on the HDD or the like to be recognized by the CPU or the like in response to the computer program.

The request receiving unit 130 corresponds to a function of causing the CPU or the like to recognize data reception of the I/F unit in response to the computer program. The specific connecting unit 140 and the telephone call forward unit 160 correspond to functions of causing the CPU or the like to operationally control data communication of the I/F unit in response to the computer program. The peripheral selecting unit 150 corresponds to a function of causing the CPU or the like to execute a predetermined data processing in response to the computer program.

The telephone relay apparatus 100 according to the embodiment also includes an order storing unit 170 which stores a plurality of the peripheral telephone terminals 400 scheduled to be located at the periphery of the specific terminal user UCY together with the transfer trying order OTP. For this reason, the peripheral selecting unit 150 selects a plurality of the peripheral telephone terminals 400 in the stored transfer trying order OTP.

More specifically, in the telephone relay apparatus 100, as the specific storing unit 110 and the peripheral storing unit 120, ID data of the specific terminal user UCY, the scheduled accompanying user SCY, and the moving prediction place MSS, link data to a transfer list, and the like are registered in units of various telephone numbers which can serve as the specific telephone number UCN and the peripheral telephone numbers STN, for example.

Figure 4:
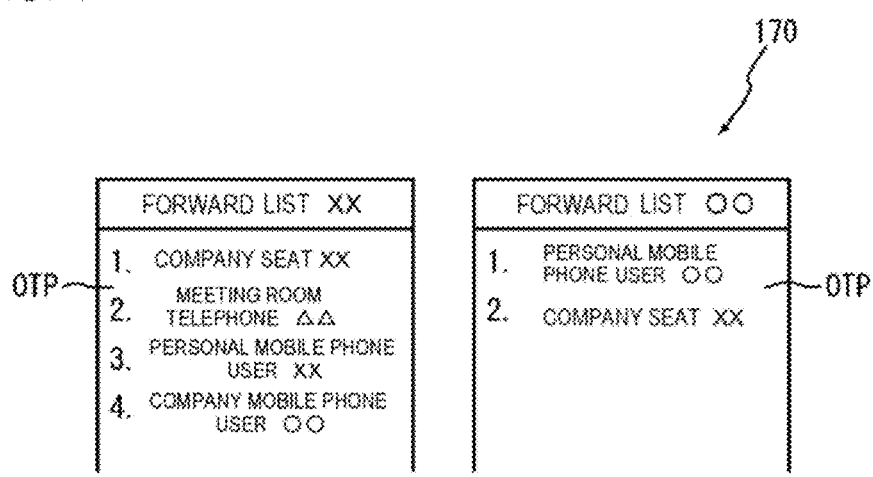
FIG. 4 is a schematic view showing a storage structure of a transfer list serving as an order storing unit.

A transfer list in which the link data is set is formed in units of specific terminal user UCY set in advance, for example, and as shown in FIG. 4, the ID data of the scheduled accompanying user SCY, the moving prediction place MSS, and the like are registered in together with the transfer trying order OTP as the order storing unit 170. The transfer list is stored in units of the specific terminal user UCY in association with the specific telephone number UCN of the specific telephone terminal 300 of the specific terminal user UCY.

The telephone call forward unit 160 transmits a guidance message of the line connecting request NOR from the outgoing telephone terminal 500 to the specific telephone terminal 300 to the telephone call execution line to the connected peripheral telephone terminal 400. At this time, the telephone call forward unit 160 generates and transmits a guidance message including a namo of the specific terminal user UCY and an outgoing telephone number of the outgoing telephone terminal 500.

As described above, the components of the telephone relay apparatus 100 are logically realized such that the various pieces of hardware execute various processing operations in accordance with the computer program as described above.

The computer program is written, for example, to cause the telephone relay apparatus 100 to execute: a specific storing process which stores the specific telephone number UCN of at least one specific telephone terminal 300 which is ordinarily used by the specific terminal user UCY; a peripheral storing process which stores the peripheral telephone numbers STN of a plurality of the peripheral telephone terminals 400 scheduled to be located at the periphery of each specific terminal user UCY; a request receiving process which receives the line connecting request NOR from the outgoing telephone terminal 500 of the arbitrary telephone outgoing user OTY to the specific telephone terminal 300; a specific connecting process which tries connection of the telephone call execution line from the outgoing telephone terminal 500 to the specific telephone terminal 300 by the specific telephone number UCN in response to the received line connecting request NOR; a peripheral selecting process which selects at least one of the peripheral telephone terminals 400 in the predetermined transfer trying order OTP when the telephone call execution line to the specific telephone terminal 300 is not connected; and a telephone call transfer process which tries connection of the telephone call execution line from the outgoing telephone terminal 500 to the selected peripheral telephone terminal 400 by each of the peripheral telephone numbers STN in the transfer trying order OTP.

In the configuration described above, a data processing method or the like realized by the telephone relay apparatus 100 according to the embodiment will be described below. When the telephone outgoing user OTY such as an external customer calls the specific telephone terminal 300 such as a company mobile phone of the specific terminal user UCY with the outgoing telephone terminal 500 such as a mobile phone terminal, this call is relayed by the telephone relay apparatus 100.

Figure 5:
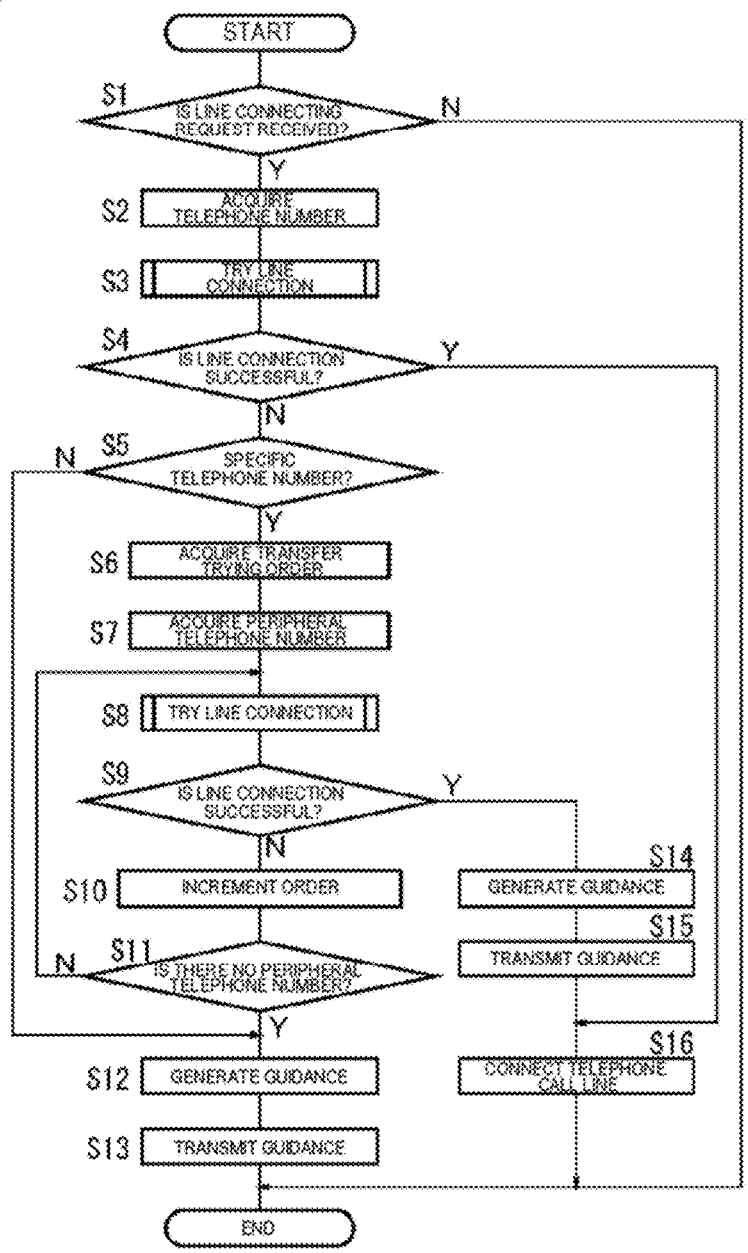
FIG. 5 is a flow chart showing a data processing method performed by the telephone relay apparatus.

At this time, the telephone relay apparatus 100, acquires the specific telephone number UCN in response to a line connecting request to the specific telephone terminal 300 which receives the call (step S1—Y, S2) as shown in FIG. 5. Connection of a telephone call execution line to the specific telephone terminal 300 is tried with the specific telephone number UCN (step S3).

When the line connection is successful (step S4—Y), a telephone call between the telephone outgoing user OTY and the specific terminal user UCY or the like is established with the telephone call execution line (step S16). On the other hand, when the telephone call execution line is not connected even though calling is executed a predetermined number of times, failure of the line connection is determined (step S4—N).

In this case, the telephone relay apparatus 100 checks whether a callee is the specific telephone terminal 300. When the caller is not the specific telephone terminal 300 (step S5—N), the telephone relay apparatus 100 generates a guidance message such as a message "At present, your connection cannot be made. Please call me back after a while" and transmits the guidance message (step S12, S13).

On the other hand, when the callee is the specific telephone terminal 300 (step S5—Y), as shown in FIG. 4, the transfer trying order OTP is acquired by a corresponding transfer list of the order storing unit 170 (step S6). The transfer list is read based on the telephone number of, for example, the specific telephone terminal 300.

The peripheral telephone numbers STN are acquired from, for example, the peripheral storing unit 120 in the transfer trying order OTP (step S7), and connection of the telephone call execution line is tried (step 38). When the line connection is successful (step S9—Y), a guidance message is generated by the telephone number of the outgoing telephone terminal 500 of the caller and identification data of the specific terminal user UCY of a callee (step S14).

For example, a guidance message such as a message "This call is a transfer from oo (telephone number of the outgoing telephone terminal 500) to xx (name of the specific terminal user UCY). Please give this call to xx (name of the specific terminal user UCY) or tell her/him to call oo (telephone number of the outgoing telephone terminal 500) back." is generated and transmitted (steps 314 and S15). Upon the transmission of the guidance message described above is completed, the telephone call execution line is connected (step S16).

For example, it is assumed that the probability of the specific terminal user UCY who always carries a mobile phone terminal lent by her/his company as the specific telephone terminal 300 being on her/his company seat in general is highest. In this case, as shown in FIG. 4, a fixed telephone terminal near the company seat is registered as a first peripheral telephone terminal 400.

Furthermore, it is assumed that the probability of the specific terminal user UCY being in a predetermined meeting room is high when the specific terminal user UCY is not on her/his company seat. In this case, a fixed telephone terminal in the meeting room is registered as a second peripheral telephone terminal 400.

Therefore, when the specific terminal user UCY is on her/his company seat while setting the specific telephone terminal 300 in an OFF state, a call to the specific telephone terminal 300 is transferred to the peripheral telephone terminal 400 near the company seat. For this reason, the specific terminal user UCY can immediately make a telephone call to the telephone outgoing user OTY.

Even though the specific terminal user UCY is on the moving prediction place MSS such as a basement meeting room in which the specific telephone terminal 300 cannot communicate with other telephones, the peripheral telephone terminal 400 which is a fixed telephone terminal in the meeting room is called.

For example, when the scheduled accompanying user SCY picks up the peripheral telephone terminal 400, the scheduled accompanying user SCY notifies of the guide message described above. For this reason, the scheduled accompanying user SCY can give the peripheral telephone terminal 400 to the specific terminal user UCY to cause the specific terminal user UCY to make a telephone call or tell the specific terminal user UCY to call oo (telephone number of the outgoing telephone terminal 500).

The connection of the telephone call execution line by using the peripheral telephone numbers STN is tried in the transfer trying order OTP (steps 38 to S31). When the telephone call execution line is not connected even with the final peripheral telephone number STN (step S11—Y), the guidance message such as a message "At present, your connection cannot be made. Please call me back after a while" is generated and returned as described above (steps S12 and S13).

In the telephone relay apparatus 100 according to the embodiment, as described above, the specific telephone number UCN of at least one specific telephone terminal 300 which is ordinarily used by the specific terminal user UCY is stored by the specific storing unit 110, and the peripheral telephone numbers STN of the plurality of peripheral telephone terminals 400 scheduled to be located at the periphery of each specific terminal user UCY are stored by the peripheral storing unit 120.

In this state, when the request receiving unit 130 receives the line connecting request NOR from the outgoing telephone terminal 500 of an arbitrary telephone outgoing user OTY to the specific telephone terminal 300, the specific connecting unit 140 tries connection of the telephone call execution line from the outgoing telephone terminal 500 to the specific telephone terminal 300 with the specific telephone number UCN in response to the received line connecting request NOR.

When the telephone call execution line is connected, a telephone call between the telephone outgoing user OTY and the specific terminal user UCY can be immediately established by the outgoing telephone terminal 500 and the specific telephone terminal 300. However, when the telephone call execution line to the specific telephone terminal 300 is not connected, at least one of the peripheral telephone terminals 400 is selected in the predetermined transfer trying order OTP.

Connection of the telephone call execution line to the peripheral telephone terminal 400 selected by the outgoing telephone terminal 500 is tried by the telephone call forward unit 160 with the peripheral telephone numbers STN in the transfer trying order OTP.

For this reason, the outgoing telephone terminal 500 which is not connected to the specific telephone terminal 300 is connected to the peripheral telephone terminal 400 to make it possible to increase the possibility that telephone call between telephone outgoing user OTY and the specific terminal user UCY can be made by the peripheral telephone terminal 400 and the outgoing telephone terminal 500. Therefore, the situation in which an emergency line connecting request NOR from the outgoing telephone terminal 500 is not connected to the specific terminal user UCY can be excluded as much as possible.

In particular, the plurality of peripheral telephone terminals 400 scheduled to be located at the periphery of the specific terminal user UCY is stored by the order storing unit 170 together with the transfer trying order OTP, and the plurality of peripheral telephone terminals 400 are selected in the stored transfer trying order OTP. For this reason, the plurality of peripheral telephone terminals 400 which may be connected can be easily called in the transfer trying order OTP.

In addition, the peripheral telephone numbers STN are registered in units of the peripheral telephone terminals 400, and only the peripheral telephone terminals 400 are registered as the transfer trying order OTP of the specific terminal user UCY. For this reason, since the peripheral telephone numbers STN need not be registered as the transfer trying order OTP of the specific terminal user UCY, the registration and the management of the peripheral telephone terminals 400 can be simplified.

When the telephone call execution line to the peripheral telephone terminals 400 is connected in response to the line connecting request NOR from the outgoing telephone terminal 500 to the specific terminal user UCY, a guidance message including the name of the specific terminal user UCY and the outgoing telephone number of the outgoing telephone terminal 500 is generated and transmitted.

Accordingly, even though the peripheral telephone terminal 400 which is carried by the scheduled accompanying user SCY, the peripheral telephone terminal 400 installed in a meeting room, or the like is called, the scheduled accompanying user SCY or the like immediately recognizes a sender and a receiver of the line connecting request NOR to make it possible to let the specific terminal user UCY know the sender and the receiver.

The present invention is not limited to the embodiment, and various modifications of the invention can be effected without departing from the spirit and scope of the invention. For example, the above embodiment illustrates that one transfer trying order OTP is set for each specific terminal user UCY as one transfer list.

However, the peripheral telephone terminal 400 scheduled to be located at the periphery of the specific terminal user UCY is stored at each line connection timing together with the transfer trying order OTP, and the peripheral telephone terminal 400 stored at the line connection timing which is matched with the current time and day may be selected in the transfer trying order OTP.

Figure 6:
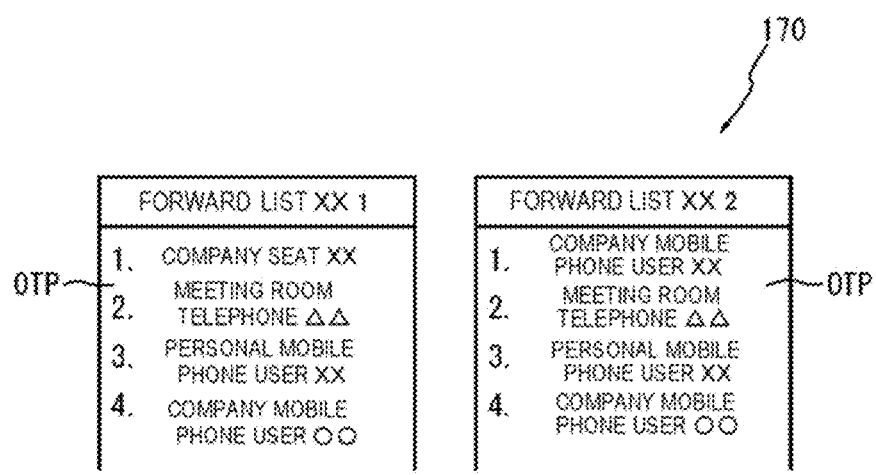
FIG. 6 is a schematic view showing a storage structure of a transfer list serving as an order storing unit according to one modification.

As shown in FIG. 6, two transfer trying orders OTP are set as two transfer lists for a certain specific terminal user UCY in the order storing unit 170, and effective timings of the transfer trying orders OTP can also be set as a morning and an afternoon for example.

In this case, the first transfer trying order OTP becomes effective in the morning, and the second transfer trying order OTP becomes effective in the afternoon, so that a telephone transfer order can be switched in accordance with a behavior pattern of the specific terminal user UCY.

The above embodiment illustrates that one transfer trying order OTP is set as one transfer list for each specific telephone terminal 300 of the specific terminal user UCY. However, the plurality of transfer trying orders OTP may be set as a plurality of transfer lists in units of the plurality of specific telephone terminal 300 of the specific terminal user UCY.

Figure 7:
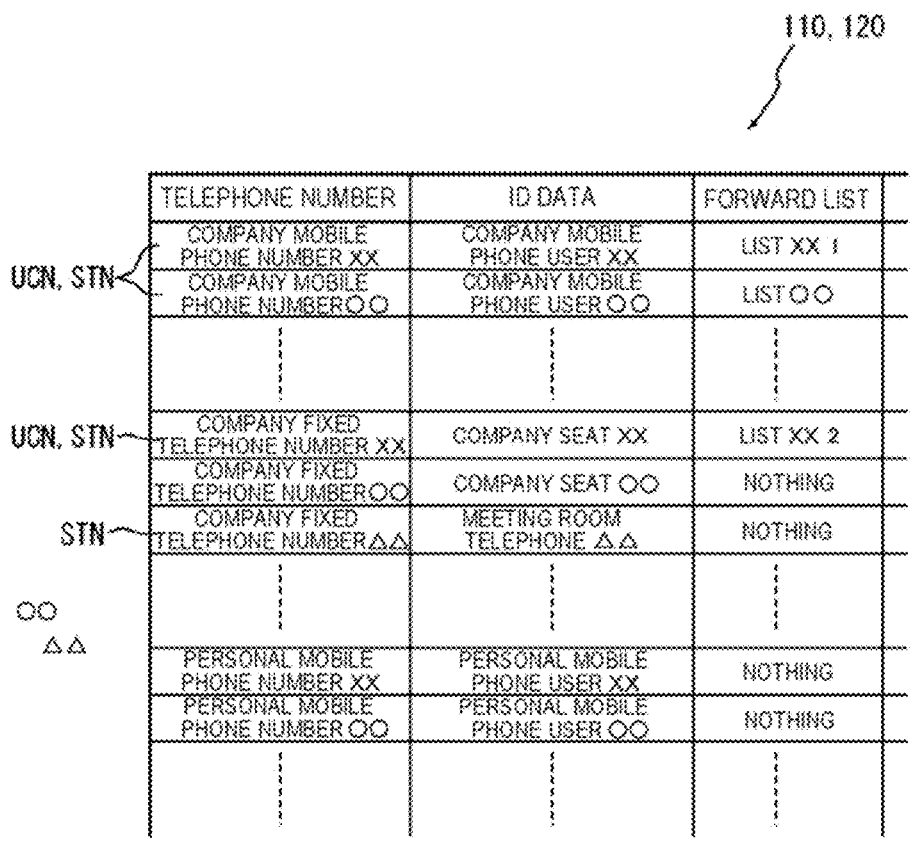
FIG. 7 is a schematic view showing a storage structure of a telephone number list serving as a specific storing unit and a peripheral storing unit according to another modification.
Figure 8:
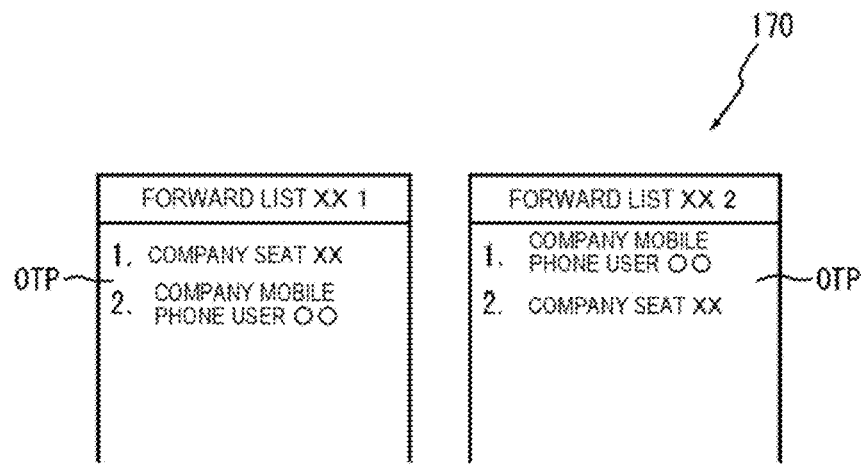
FIG. 8 is a schematic view showing a storage structure of a transfer list serving as an order storing unit according to another modification.

For example, as shown in FIGS. 7 and 8, the company mobile phone and a company scat telephone of a certain specific terminal user UCY are set as the specific telephone terminals 300 respectively, and the transfer trying orders OTP may be set for each of the specific telephone terminals 300 as transfer lists respectively.

In this case, when the company mobile phone is called in response to the line connecting request NOR not to make connection to the telephone call execution line, the company seat telephone is called. When the company seat telephone is called not to make connection to the telephone call execution line, the company mobile phone can be called.

Furthermore, the above embodiment illustrates that the moving prediction place MSS is fixedly registered for each specific terminal user UCY and connection of the telephone execution line to the peripheral telephone terminal 400 at the moving prediction place MSS is tried.

However, the order storing unit 170 may store the moving prediction place MSS of the specific terminal user UCY at each line connection timing together with the transfer trying order OTP, and the peripheral selecting unit 150 may select the peripheral telephone terminal 400 at the moving prediction place MSS stored at the line connection timing matched with the current time and day in the transfer trying order OTP (not shown).

In this case, when a certain specific terminal user UCY is in a specific meeting room in only the morning on Monday for example, the morning on Monday and the specific meeting room are registered as the line connection timing and the moving prediction place MSS, respectively, so that the peripheral telephone terminal 400 installed in the specific meeting room can be called in only the morning on Monday in response to the line connecting request NOR to the specific terminal user UCY.

Similarly, the order storing unit 170 may store the scheduled accompanying user SCY of the specific terminal user UCY together with the transfer trying order OTP at each line connection timing, and the peripheral selecting unit 150 may select the peripheral telephone terminal 400 of the scheduled accompanying user SCY stored at the line connection timing matched with the current time and day in the transfer trying order OTP.

In this case, when the specific terminal user UCY accompanies a specific scheduled accompanying user SCY in only the morning on Monday, the morning on Monday and the specific scheduled accompanying user SCY are registered as the line connection timing and the moving prediction place MSS, respectively, so that the peripheral telephone terminal 400 carried by the specific scheduled accompanying user SCY can be called in only the morning on Monday in response to the line connecting request NOR to the specific terminal user UCY.

As described above, it is generally executed as a so-called scheduler that the moving prediction place MSS or the scheduled accompanying user SCY is registered every time and day. Therefore, the moving prediction place MSS or the scheduled accompanying user SCY is registered every time and day in a data processing apparatus such as a database server of a group to which the specific terminal user UCY belongs. The telephone relay apparatus 100 may refer to the moving prediction place MSS or the scheduled accompanying user SCY.

The telephone relay apparatus 100 has an external referring unit which refers to a prediction storing unit of a data processing apparatus which stores the moving prediction place MSS or the scheduled accompanying user SCY of the specific terminal user UCY at each line connecting timing (not shown).

In this case, when the specific terminal user UCY registers the moving prediction place MSS or the scheduled accompanying user SCY in the data processing apparatus as usual, the telephone relay apparatus 100 refers to the moving prediction place MSS or the scheduled accompanying user SCY to make it possible to transfer the line connecting request NOR.

The above embodiment illustrates only that the operation is ended when the telephone relay apparatus 100 completes the transfer of the telephone call execution line. However, a line connection history may be recorded by a history recording unit (not shown) based on the operations of the specific connecting unit 140 and the telephone call forward unit 160. In this case, a caller and a callee of the telephone call, the time when the telephone call is made, a method of transferring the telephone call, and whether the telephone call execution line is connected or not are recorded.

Furthermore, a transfer trying order may be corrected by an order correcting unit based on the line connection history. The order correcting unit can correct the transfer trying order OTP by a predetermined algorithm.

For example, when the telephone call execution line is connected to the first peripheral telephone terminal 400 at a probability of 1/10, and the telephone call execution line is connected to the second peripheral telephone terminal 400 at a probability of 8/10, it can be supposed that the order of the first and second peripheral telephone terminals 400 is reversed. In order to perform the process, information representing the number of times connection is tried and information representing the number of times the connection is successful may be stored for each of the peripheral telephone terminals 400.

In this case, the telephone call execution line can be more easily connected at a high probability. Even though various situations of the specific terminal user UCY change, the transfer trying order OTP can be automatically and optimally corrected in accordance with the change of the situations.

The above embodiment illustrates that the components of the telephone relay apparatus 100 are logically realized by a computer program as various functions. However, the components can also be formed as pieces of hardware, and can also be realized as combinations of software and hardware.

As a matter of course, the above embodiments and the plurality of modifications can be combined to each other unless the contents thereof do not conflict. In the embodiments and the modifications, the structures of the components are concretely described. However, the structures can also be variably changed as long as the present invention is satisfied.

It is apparent that the present invention is not limited to the above embodiment, and may be modified and changed without departing from the scope and spirit of the invention.

What is claimed is:

1. A telephone relay apparatus comprising:
   a specific storing unit which stores a specific telephone number serving as a telephone number of at least one specific telephone terminal used by a specific terminal user;
   a peripheral storing unit which stores peripheral telephone numbers serving as telephone numbers of a plurality of peripheral telephone terminals scheduled to be located at a periphery of the specific terminal user;
   a request receiving unit which receives a line connecting request from an outgoing telephone terminal of an arbitrary telephone outgoing user to said specific telephone terminal;
   a specific connecting unit which tries a connection of a telephone call execution line from said outgoing telephone terminal to said specific telephone terminal by said specific telephone number in response to said received line connecting request;
   a peripheral selecting unit which selects at least one peripheral telephone terminal according to a predetermined transfer trying order when said telephone call execution line to said specific telephone terminal is not connected;
   a telephone call forward unit which tries a connection of said telephone call execution line from said outgoing telephone terminal to said selected peripheral telephone terminal with said peripheral telephone numbers; and
   an order storing unit which stores a scheduled accompanying user of said specific terminal user at a line connection timing together with a transfer trying order,
   wherein said peripheral storing unit stores at least some of said peripheral telephone numbers for each of said peripheral telephone terminals carried by said scheduled accompanying user, and
   said peripheral selecting unit selects said peripheral telephone terminal of said scheduled accompanying user stored at said line connection timing matched with a current date and time in said transfer trying order,
   the scheduled accompanying user being scheduled to be located at the periphery of the specific terminal user.

2. A telephone relay apparatus comprising:
   a specific storing unit which stores a specific telephone number serving as a telephone number of at least one specific telephone terminal used by a specific terminal user;
   a peripheral storing unit which stores peripheral telephone numbers serving as telephone numbers of a plurality of peripheral telephone terminals scheduled to be located at a periphery of the specific terminal user;
   a request receiving unit which receives a line connecting request from an outgoing telephone terminal of an arbitrary telephone outgoing user to said specific telephone terminal;
   a specific connecting unit which tries a connection of a telephone call execution line from said outgoing telephone terminal to said specific telephone terminal by said specific telephone number in response to said received line connecting request;
   a peripheral selecting unit which selects at least one peripheral telephone terminal according to a predetermined transfer trying order when said telephone call execution line to said specific telephone terminal is not connected;
   a telephone call forward unit which tries a connection of said telephone call execution line from said outgoing telephone terminal to said selected peripheral telephone terminal with said peripheral telephone numbers; and
   an external referring unit which refers to an external prediction storing unit which stores a scheduled accompanying user of said specific terminal user at a line connection timing,
   wherein said peripheral storing unit stores at least some of said peripheral telephone numbers for each of said scheduled accompanying users who carry said peripheral telephone terminals, and
   wherein the peripheral selecting unit selects said peripheral telephone terminal of said scheduled accompanying user stored at said line connection timing matched with a current date and time,
   the scheduled accompanying user being scheduled to be located at the periphery of the specific terminal user.

3. The telephone relay apparatus according to claim 1, wherein
   said telephone call forward unit transmits a guidance message of said line connecting request from said outgoing telephone terminal to said specific telephone terminal to said telephone call execution line to said connected peripheral telephone terminal.

4. The telephone relay apparatus according to claim 3, wherein
said telephone call forward unit generates and transmits said guidance message including a name of said specific terminal user.

5. The telephone relay apparatus according to claim 3, wherein
said telephone call forward unit generates and transmits said guidance message including an outgoing telephone number of said outgoing telephone terminal.

6. The telephone relay apparatus according to claim 1, further comprising:
a history recording unit which records a line connection history based on operations of said specific connecting unit and said telephone call forward unit.

7. The telephone relay apparatus according to claim 6, further comprising:
an order correcting unit which corrects said transfer trying order based on said line connection history.

8. A telephone relay system comprising:
a telephone relay apparatus according to claim 1; and
a data processing apparatus which holds said order storing unit to communicate with said telephone relay apparatus.

9. A non-transitory recording medium which records a computer program for a telephone relay apparatus, said computer program when executed by a processor causing said telephone relay apparatus to execute:
a specific storing process which stores a specific telephone number serving as a telephone number of at least one specific telephone terminal used by a specific terminal user;
a peripheral storing process which stores peripheral telephone numbers serving as telephone numbers of a plurality of peripheral telephone terminals scheduled to be located at a periphery of the specific terminal user;
a request receiving process which receives a line connecting request from an outgoing telephone terminal of an arbitrary telephone outgoing user to said specific telephone terminal;
a specific connecting process which tries a connection of a telephone call execution line from said outgoing telephone terminal to said specific telephone terminal by said specific telephone number in response to said received line connecting request;
a peripheral selecting process which selects at least one of said peripheral telephone terminals according to a predetermined transfer trying order when said telephone call execution line to said specific telephone terminal is not connected;
a telephone call transfer process which tries a connection of said telephone call execution line from said outgoing telephone terminal to said selected peripheral telephone terminal with said peripheral telephone numbers; and
an order storing process which stores a scheduled accompanying user of said specific terminal user at a line connection timing together with a transfer trying order,
wherein said peripheral storing process stores at least some of said peripheral telephone numbers for each of said peripheral telephone terminals carried by said scheduled accompanying user, and
said peripheral selecting process selects said peripheral telephone terminal of said scheduled accompanying user stored at said line connection timing matched with a current date and time in said transfer trying order,
the scheduled accompanying user being scheduled to be located at the periphery of the specific terminal user.

10. A data processing method for a telephone relay apparatus comprising:
a specific storing operation of the telephone relay apparatus which stores a specific telephone number serving as a telephone number of at least one specific telephone terminal used by a specific terminal user;
a peripheral storing operation of the telephone relay apparatus which stores peripheral telephone numbers serving as telephone numbers of a plurality of peripheral telephone terminals scheduled to be located at a periphery of the specific terminal user;
a request receiving operation of the telephone relay apparatus which receives a line connecting request from an outgoing telephone terminal of an arbitrary telephone outgoing user to said specific telephone terminal;
a specific connecting operation of the telephone relay apparatus which tries a connection of a telephone call execution line from said outgoing telephone terminal to said specific telephone terminal by said specific telephone number in response to said received line connecting request;
a peripheral selecting operation of the telephone relay apparatus which selects at least one of said peripheral telephone terminals according to a predetermined transfer trying order when said telephone call execution line to said specific telephone terminal is not connected;
a telephone call transfer operation of the telephone relay apparatus which tries a connection of said telephone call execution line from said outgoing telephone terminal to said selected peripheral telephone terminal with said peripheral telephone numbers; and
an order storing operation of the telephone relay apparatus which stores a scheduled accompanying user of said specific terminal user at a line connection timing together with a transfer trying order,
wherein said peripheral storing operation stores at least some of said peripheral telephone numbers for each of said peripheral telephone terminals carried by said scheduled accompanying user, and
said peripheral selecting operation selects said peripheral telephone terminal of said scheduled accompanying user stored at said line connection timing matched with a current date and time in said transfer trying order,
the scheduled accompanying user being scheduled to be located at the periphery of the specific terminal user.

* * * * *